Jan. 8, 1952        W. PALMER        2,581,438

NAVIGATION COMPUTER AND PILOTING SYSTEM

Filed March 30, 1946        4 Sheets-Sheet 1

INVENTOR
WINSLOW PALMER
BY
ATTORNEY

Jan. 8, 1952          W. PALMER          2,581,438

NAVIGATION COMPUTER AND PILOTING SYSTEM

Filed March 30, 1946          4 Sheets-Sheet 3

INVENTOR
WINSLOW PALMER
BY
ATTORNEY

Jan. 8, 1952     W. PALMER     2,581,438
NAVIGATION COMPUTER AND PILOTING SYSTEM
Filed March 30, 1946     4 Sheets-Sheet 4

INVENTOR.
WINSLOW PALMER
BY
ATTORNEY

UNITED STATES PATENT OFFICE 2,581,438

NAVIGATION COMPUTER AND PILOTING SYSTEM

Winslow Palmer, West Hempstead, N. Y., assignor to The Sperry Corporation, a corporation of Delaware Application March 30, 1946, Serial No. 658,427

7 Claims. (Cl. 250—2)

This invention relates generally to computers, and, more particularly, to means and methods, including computers utilizing electrical vectors, for the automatic solution of navigational problems in the position finding and guidance of mobile craft.

The practical aspect of various navigation systems frequently involves the solution of mathematical equations which have their counterparts in physically realizable quantities whereby craft may be directed to a desired objective irrespective of visibility, wind, drift and other conditions.

Calculating apparatus or computers, including mechanical components, have heretofore been proposed to solve complicated mathematical relationships such as appear, for example, in the conversion of one set of arbitrary geometric coordinates into those of another coordinate system.

While in certain instances, it has been proposed to combine such mechanical components or apparatus with separate electrical devices, these devices have only been of subordinate importance as compared with the mechanical apparatus used.

Thus, in prior art systems, the solution of the navigational problem has been carried out by devices including components having mechanical multipliers, cams and differentials which give a result in terms of mechanical displacement or dial readings, or by a series of potentiometers arranged in conjunction with such mechanical apparatus to provide a network of functional voltage dividers to give a result proportional to an amplitude of voltage, or by a geometric solution which is indicated by the intersection of a pair of pointers, arms or light beams usually superposed on a map.

The present invention, however, is a purely electrical method of computing and may be used to solve navigational problems by means of a system of electrical vectors. These vectors utilize as a basis for their solution the relative phase angle established between two compared alternating voltages as well as amplitudes of voltage introduced to the computer as the electrical counterparts of physical positional data.

The general proposition inherent in the invention is to generate assumed electrical vectors and to synthesize vectors corresponding to known positional data and obtain other vectors as outputs which are the counterparts of the physical solution and which are realizable as electrical voltages or mechanical movements for controlling associated position indicating or navigational guidance equipment.

The versatility and adaptability of the present invention is seen by its use in the conversion of data from one system of geometric coordinates to another when such conversion becomes necessary to the proper solution of a navigational problem. For example, the computer is readily adaptable in a navigational system founded upon a system of hyperbolic coordinates. In one such system, known as the "Loran system" described in "Electronics" magazine of November, 1945, there is provided means for determining the position of a mobile craft by obtaining radio signals at the craft from a plurality or chain of radio transmitters, and measuring the time differences of reception of these radio signals from any two stations, at the craft.

From the mathematical definition of a hyperbola, it is seen that this constant time difference of reception at the craft defines one of a family of hyperbolae laid out along a base line established between two of said radio transmitters acting as focii thereof. By receiving indications from two such pairs of transmitters, the position of the craft is ascertainable as at the point of intersection of two intercepting hyperbolae. A positional "fix" is then determined by referring to a special map laid out in hyperbolic coordinates.

Further, a "Loran" received has been constructed which continuously indicates and automatically determines the difference of the distances from said receiver to the radio transmitters in microseconds or in miles.

The present computer is enabled to utilize this data as obtainable from such a "Loran" receiver and to convert the information received in terms of hyperbolic coordinates into another system of coordinates, e. g., polar or rectangular, which will allow the determination of the absolute distance and direction to a desired objective substantially automatically so that instant positions may be plotted continuously.

To do this, the present novel computer sets up a system of assumed electrical vectors which are compared to the data as given by the signals received at the "Loran" receiver. The computer then continuously compares these electrical vectors with the indications received at the "Loran" receiver and continuously adjusts the electrical equations so that the electrical vectors eventually equal the distance data obtained from the "Loran" receiver. The electrical system then exactly represents the physical problem involved and the outputs therefrom present the physical problem in terms of distance and direction to the transmitting stations. These outputs are readily utilizable to control associated stabilization and navigation guidance equipment such as an automatic pilot device, including a directional gyroscope which will direct the craft to a desired location or objective.

In another of its aspects the present novel computer is adapted for use in navigational systems utilizing data as supplied by a system including dual control means responsive to intersecting lines of position. This information is converted into electrical vectors representing position as given by a system of rectangular coordinates.

It is, therefore, a principal object of the present invention to provide a computer using a system of electrical vectors.

Another object of the present invention is to provide a computer for the solution of navigational problems by means of a system of electrical vectors.

Another object of the present invention is to provide for the solution of mathematical equations through the use of a computer utilizing a system of electrical vectors.

Still another object of the present invention is to provide an automatic radio guidance system in which an electrical vector computer is an integral part.

Still another object of the present invention is to provide means and methods for deriving solutions of navigational problems in physically realizable quantities which are indicative of positional measurements and guidance errors.

Still another object of the present invention is to provide a computer for converting information based upon an arbitrary set of geometric coordinates into outputs ascertainable in terms of a different set of geometric coordinates.

A further object of the invention is to provide improved apparatus and instrumentalities embodying novel features and principles adapted for use in realizing the above objects and also adapted for use in other fields.

Still other objects and features of the present invention will be afforded by the following detailed description considered in combination with the accompanying drawings and those features which are believed to be novel and patentable will be pointed out in the claims appurtenant thereto.

In the drawings:

Fig. 4 is a block diagram of a circuit used in the present invention for establishing a constant quadrature phase relationship between reference voltages employed in the apparatus of Fig. 3;

Fig. 5 is a block diagram illustrative of a modification made to the invention as shown in Fig. 3; and Fig. 6 is a vector diagram useful in explaining the operation of Fig. 4.

Like reference characters are utilized throughout the drawing to designate like parts.

Figure 1:
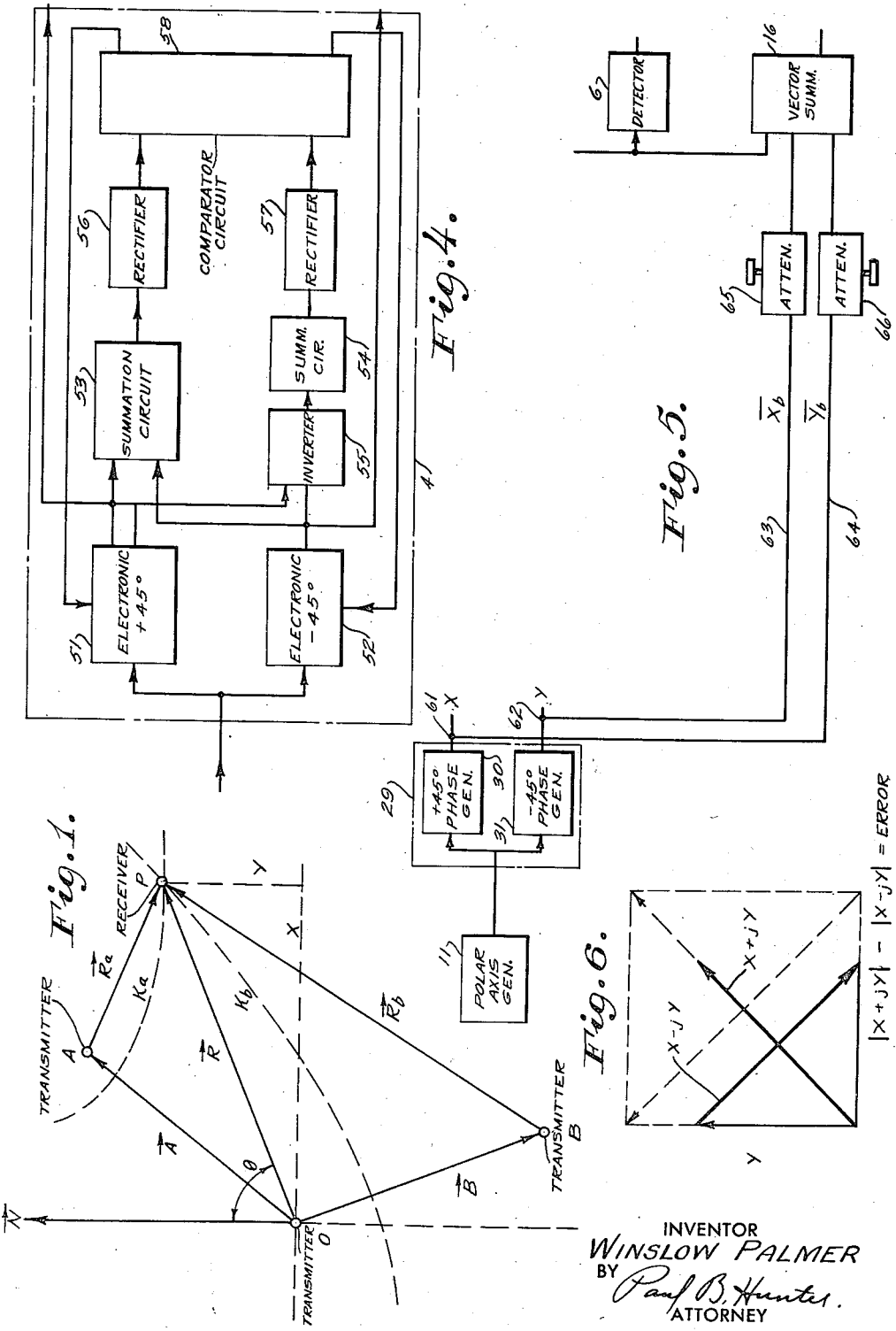
Fig. 1 is a graph illustrating a navigational problem solved by the present invention.

Referring now to Fig. 1 there is shown in graphical representation a physical navigation system with which the present invention is employable. This system makes use of a chain of individual radio transmitters A, O and B arranged in a predetermined manner so as to emit radio signals at a definite periodicity and frequency.

The system is readily adaptable to a hyperbolic coordinate system wherein the transmitted signals are received at the distant craft by a suitable receiver-indicator whose readings denote the position of the craft as a function of the distance differences of the receiver from the transmitter chain in microseconds or in miles.

The three transmitters located at A, O and B are displaced from the receiver P at a distance and direction representable by vector R.

It is this vector quantity which is determined by the electronic computer hereinafter described.

Symbolically and as used in the drawings and description, A is the vector distance from point O to point A, and B is the vector distance from point O to point B. A and B are fixed quantities forming the base lines of the hyperbolic navigational system, and $R_a$ and $R_b$ the vector distances of the receiver P from transmitting stations A and B, respectively.

In the solution of the navigation problem, N is represented as a reference vector to which the angle R, $R_a$ and $R_b$, i. e., $RR_a$ and $RR_b$ is referred. If N is considered to be direction of true north at station O, then it follows from the definition of a "bearing" as the number of degrees from true north in a clockwise direction, that the angle of R is the true bearing at a point P. Further, by hyperbolic definition the position of the receiver at P, may be determined by the simultaneous solution of the formulae below:

(1) $$K_a = |R| - |R_a|$$
(2) $$K_b = |R| - |R_b|$$

where $K_a$ and $K_b$ are the constants of the hyperbolae intersecting at P.

Figure 2:
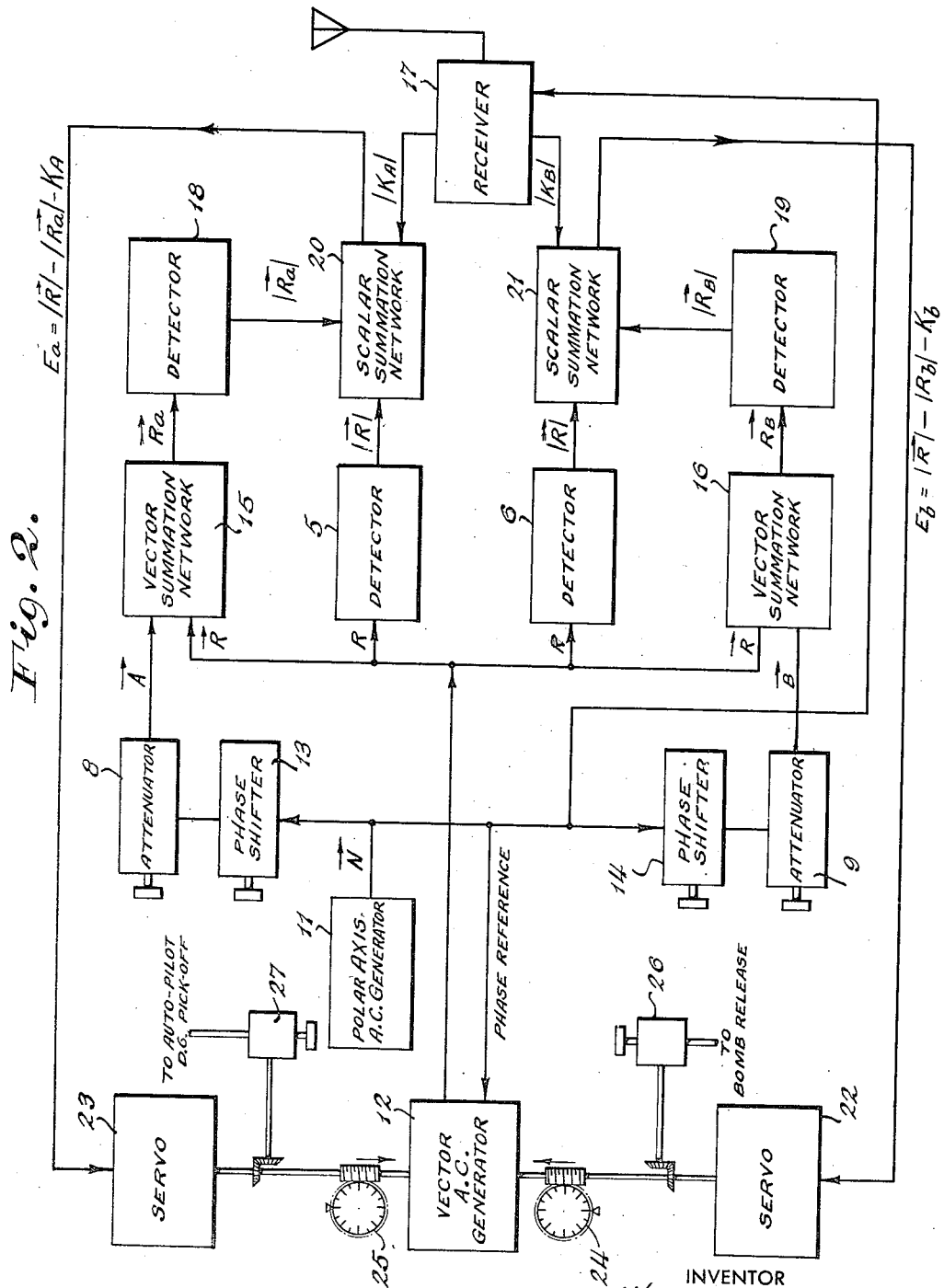
Fig. 2 is a block diagram of a preferred embodiment of the present invention as adapted for use with a navigational system based on hyperbolic coordinates.
Figure 7:
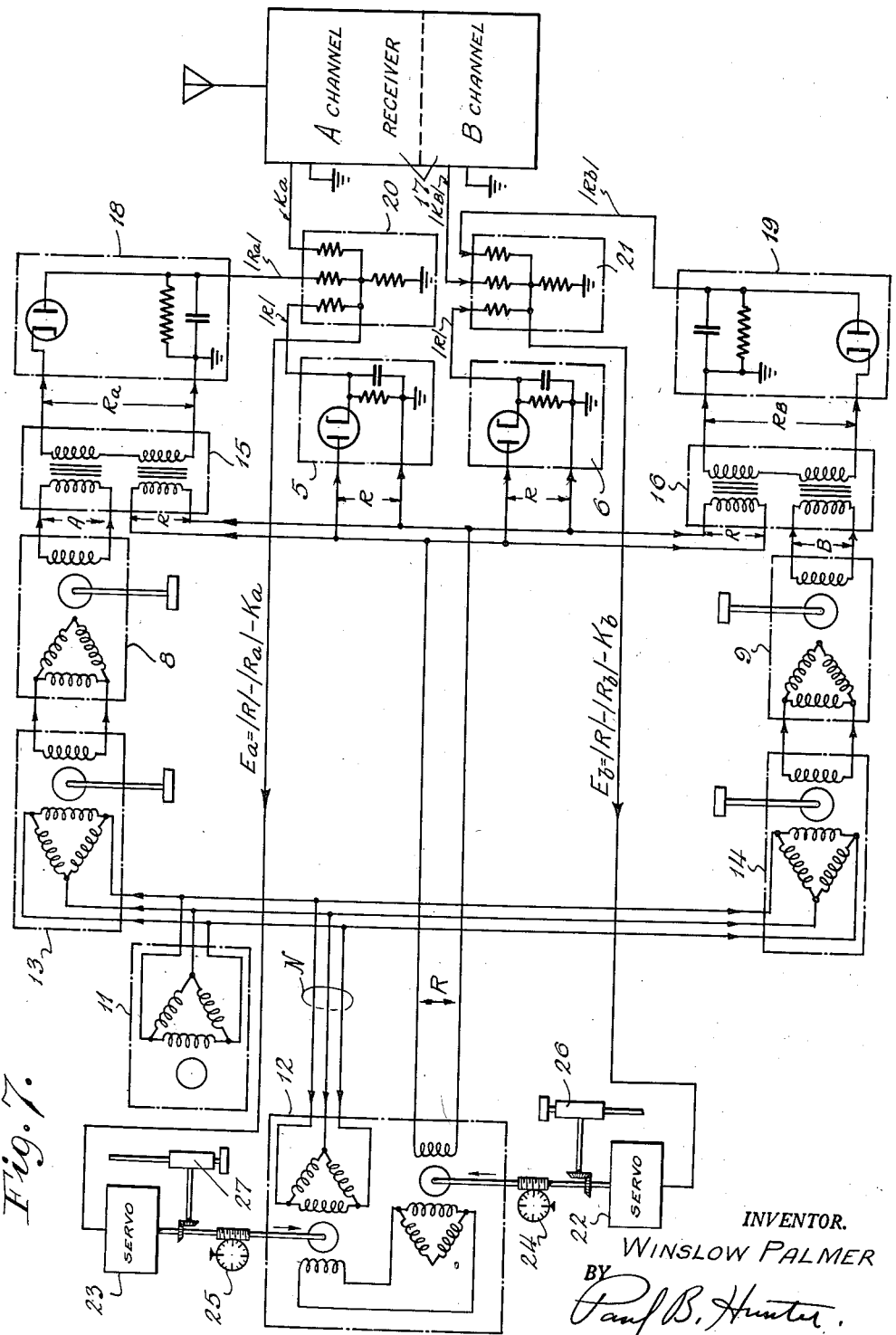
Fig. 7 is a detailed schematic diagram of the block diagram of Fig. 2.

Fig. 2 is a block diagram and Fig. 7 is the same diagram in more detail of the electrical components used to solve the navigation problem as illustrated in the physical system described in Fig. 1.

A receiver of the continuous Loran type is located in a craft so as to receive radio signals transmitted from ground stations, O, A and B with the distance differences $K_a$ and $K_b$, being continuously determined thereby for use with the computer as hereinafter described.

These receiver indications or readings are given in the form of magnitudes of unidirectional currents which are proportional to the distance differences $K_a$ and $K_b$.

It is to be understood, however that these indications may take any desired form such as direct meter readings, or mechanical displacements, but are here obtained as magnitudes of currents or voltages so as to be the more readily adaptable with the preferred forms of the present invention.

To create the reference vector or, more specifically, the true bearing angle or polar axis vector N to which all other electrical vectors and scalar quantities are to be ultimately compared, polar axis generator, or vacuum tube oscillator 11 supplying a reference phase alternating voltage output having a convenient constant magnitude and frequency is utilized.

In order to generate the electrical counterpart of the distance of the radio receiver from the master transmitter O, i. e., to determine position vector R electrically, an alternating current generator or oscillator 12 is used which operates substantially at the same frequency as polar axis generator 11. Vector R is obtained by comparing the phase or magnitude of the output of generator 12 with the phase or magnitude of the output from polar axis vector generator 11, and modifying or controlling the result by means of a continuous closed circuit control system as will be hereinafter described.

The determined amplitude of vector R is then substantially proportional to the distance of transmitter O from receiver P, and its phase angle relative to vector N corresponds to the absolute direction of the receiver P as received from transmitter O, and as diagrammatically shown in Fig. 1.

As stated, the output of polar generator 11 is an electrical vector N having both a magitude and a phase. Vector N is convertible into vectors A and B which, referring to Fig. 1, are seen to represent the distances of transmitters A and B respectively from the master transmitter O.

To separately obtain vector A and B and their subsequent derivatives, the output from reference generator 11 is directed to suitable adjustable phase shifters 13, 14 and associated attenuator circuits 8, 9. These are predeterminedly set as needed so as to alter the phase of the reference voltage obtained from generator 11 in accordance with the known absolute direction of transmitters A and B as taken from transmitter O.

Since vectors A and B represent finite distances and have electrical correspondence to an amplitude of voltage generated by polar axis generator 11, which amplitude remains unaltered through phase shifters 13 and 14, the outputs therefrom when passed to attenuators 8 and 9 are modified in amplitude to represent the known distances lying between transmitters A, B and O respectively.

Thus, alternating voltages which are the electrical equivalents of the physical relationship established between transmitters O, A and B, as illustrated in Fig. 1, are set into the electrical computer.

These electrical vectors corresponding to legs OA and OB of the navigational triangle are thus provided for the subsequent solution of the navigational problem.

These electrical vectors or voltages having an amplitude equal to OA and OB, and a phase or direction determined by phase shifters 13 and 14 are routed to vector voltage summation networks 15, 16 wherein they are electrically or vectorially added to a synthesized voltage obtained from R vector generator 12. This voltage electrically equals the distance and direction of receiver P from transmitter O. Vector R, as later derived by the electrical circuits hereinafter described, is made to equal the exact distance OP, properly directed from transmitter O toward receiver P.

The vectorial or resultant voltages delivered by vector summation networks 15, 16 provide the electrical counter-parts of the distances between transmitters A, B and receiver P and correspond to vectors $R_a$, $R_b$ as seen in Fig. 1.

Ultimately, the solution of the navigational problem is obtainable only by satisfying equations:

(3) $\quad E_a = |R| - |R_a| - K_A$
(4) $\quad E_b = |R| - |R_b| - K_B$ where $E_a$ and $E_b$ are error voltages used to maintain the equivalence of the aforestated equations:

(1) $\quad K_a = |R| - |R_A|$
(2) $\quad K_b = |R| - |R_B|$

It follows, then, that both sides of these equations are balanced by reducing any error voltages to substantially zero magnitude as by the use of inverse feedback arrangements, continuous closed circuit control systems or servo mechanisms acting to offset any electrical unbalance, error, or electrical deviations.

In the solution of the problem, $K_a$ and $K_b$ as stated, are signals representing the differences in the distance between point P and the known positions of transmitters O and A and are obtainable from the output of the "Loran" receiver 17. $R_a$ and synthesized vector R have previously been developed electrically and are now available for the further solution of the navigational problem.

However, since it is the absolute magnitude of the vectors $R_a$, $R_b$ and R which must be compared in a suitable comparator circuit so as to determine $E_a$ or $E_b$, these vectors, which are alternating current voltages, are fed to rectifiers or detectors 18 and 19 so as to obtain direct current or rectified outputs equivalent electrically to the absolute magnitude of both vectors $|R|$ and $|R_a|$ obtained through use of detectors 5 and 6. It is these rectified outputs equivalent to $|R|$ and $|R_a|$ which are compared in scalar summation network circuits 20, 21 in order to determine error control voltages.

As stated previously, the vector R, utilized at this point in the solution of the problem, is a synthesized vector which may or may not be able to fulfill the exact phasal and amplitude requirements necessary to satisfy the electrical and physical equation.

If such is found to be the case, an error signal $E_a$ or $E_b$ will separately appear as the output of scalar summation networks 20 or 21.

The error voltages $E_a$ or $E_b$ are then adapted to control either the amplitude or the phase of the assumed synthesized vector R in such manner as to make the necessary adjustments to satisfy the mathematical relationships by developing the actual vector R.

It is to be noted that error signals $E_a$ and $E_b$ which are routed to distance correction servo mechanism 22, and angle correction servo mechanism 23 respectively, function independently of one another and control the magnitude and phase of vector R with substantially no interaction between them.

For example, if servo 22 is inactivated, thus fixing the value of $|R|$ in equation, $K_a - |R| - |R_b| \neq 0$, then, phase angle $\phi$ of vector R will be altered by angle correction servo 23 until the error in the system vanishes or is reduced to zero. As a consequence thereof vector R must terminate somewhere on the hyperbola defined by $K_a$.

However, if servo 22 is activated and $|R| - |R_b| - K_b \neq 0$; servo 22 would change the length of vector R. As $|R|$ changes, servo 23 varies angle $\phi$ so as to maintain vector R on hyperbola $K_a$ and vector R would thus move along $K_a$ until it intercepts the hyperbola defined by $K_b$. At this point both error signals would be zero and the system would be stable or in a balanced condition. Vector R at this point correctly represents the distance and direction of P from station O.

By means of suitable indicating devices, such as a dial 24, calibrated in terms of distance, and a dial 25, calibrated in terms of angle, direct reading indications of the distance and directional bearing of P from O are obtainable, as motivated by means of servos 22 and 23, respectively.

Moreover, the data obtained by such indicators are readily convertible into mechanical movements or displacement voltages for activating a mechanical crab or are directed to associated suitable stabilization and/or navigational guidance equipment; i. e., automatic pilot 27 including a directional gyroscope for continuously and automatically directing the craft to a desired location.

In time of war the data thus obtained from distance indicator 24 may have associated therewith automatic ordnance projectile release means 26 for launching missiles at properly determined distances.

Figure 3:
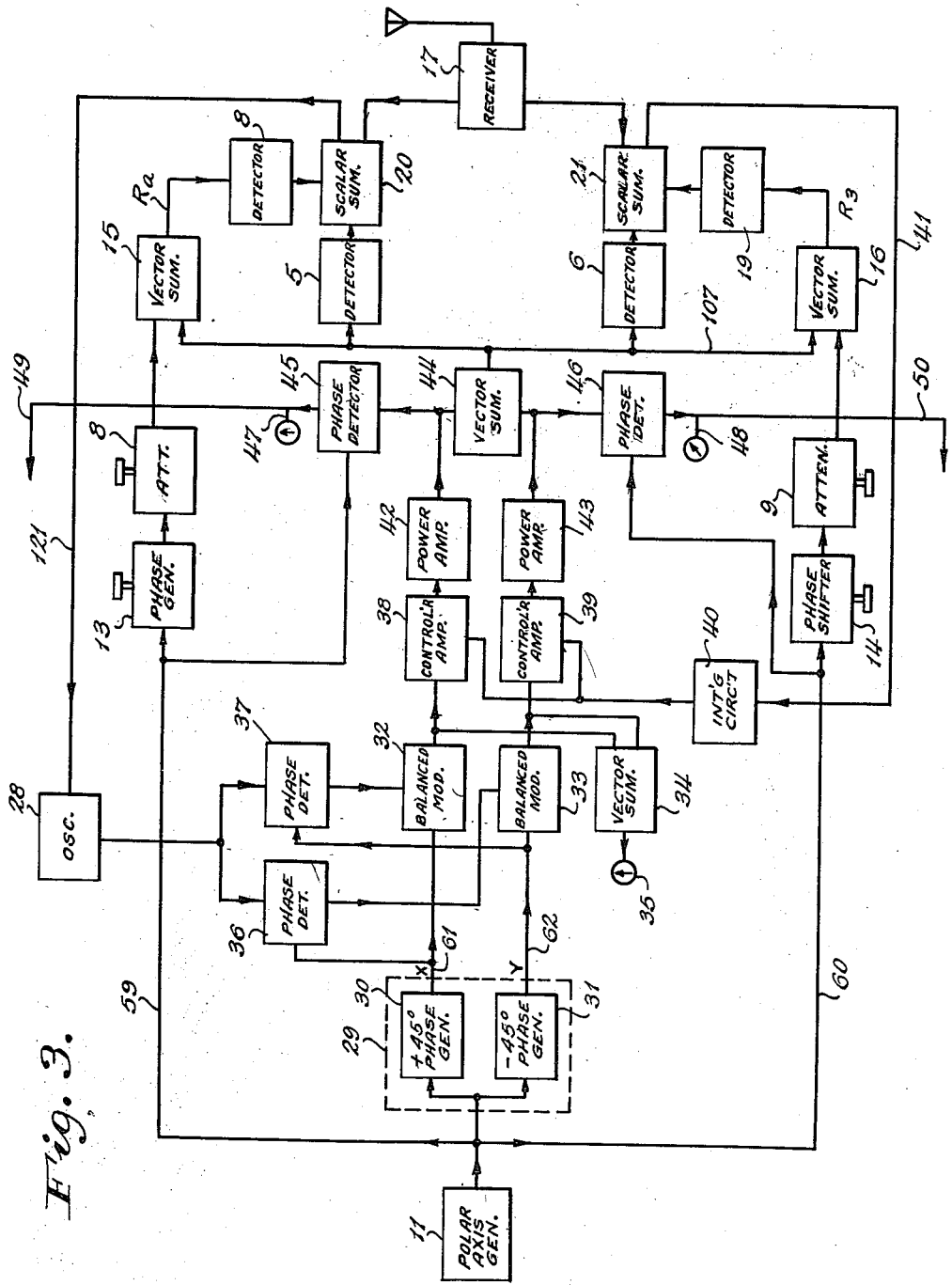
Fig. 3 is a block diagram of a modification of the invention shown, wherein the servo units shown in Fig. 2 have been replaced by purely electrical circuits.

For synthesizing vector R used in obtaining the solution of the navigational problem, reference to Fig. 3 illustrates a modification of the invention shown in Fig. 2 for deriving positional information from the computer in terms of rectangular coordinates while still controlling the system in terms of polar coordinates; i. e., by adjustment of the phase and amplitude of the R vector.

In Fig. 3 component parts or functional units previously described in Fig. 2 have retained the same reference characters and the explanation progresses in accordance therewith in order to avoid undue repetition.

In the synthesis of vector R by means of the R vector generator 12, an oscillator 28 is arranged so as to generate a voltage of substantially constant amplitude at a frequency approximately equal to that of polar axis generator 11. The frequency or phase of oscillator 28 in R vector generator 12 is controlled by error signal $E_a$ obtained as an output from scalar summation circuit 20.

The frequency control of oscillator 28 is obtained electronically as by an electric reactance circuit having a sensitivity such that the frequency of oscillator 28 is controlled over a small frequency difference by a substantially small error signal.

In such a circuit, the gain in the control circuit is made such that the mathematical relationships of the computer are satisfied to any degree of accuracy while still maintaining full control over oscillator 28.

It is to be noted, moreover, that unlike a mechanical servo system, a minute amplified error is always present so as to control oscillator 28 since there is no exact counterpart to the follow-up voltage always present in an electro-mechanical servo system.

A portion of the output of polar axis generator 11 is supplied to phase splitting network 29, one form of which is shown in detail in Fig. 4, but which may take the form of forty-five degree (45°) phase shifting networks 30 and 31 for introducing leading and lagging phase angles such that the outputs from networks 30 and 31 are displaced in phase quadrature. The alternating potentials, then, appearing as the dual outputs from phase splitting network 29 are the equivalent electrical counterparts of the coordinates X and Y as shown in Fig. 1.

The amplitude of the X and Y voltages are controlled in two operations; first by altering their amplitudes in such a manner that their vector sum remains a constant, thus permitting the generation of a vector whose phase is controlled without affecting its amplitude and which will satisfy the known equation:

(5) $\quad X+jY=Z$

Where Z is a constant.

The amplitudes of these two voltages are then modified in like proportion by a further circuit, as will be described, so that the vector sum of these voltages is altered without affecting the phase angle of the vector relative to the reference phase of the original voltage generated by polar axis generator 11.

To satisfy the first criterion, that is, to alter the relative amplitudes of the X and Y voltages without altering the amplitude of their vector resultant, these voltages are supplied to balanced modulators 32 and 33.

The amplitudes of the output voltages of these balanced modulators are substantially proportional to the amplitude of direct control voltages applied thereto and the phase of the alternating output voltages reverses with reversal of the polarity of the direct control potentials.

Balanced modulator 32 is controlled by a voltage substantially proportional to the sine of the phase angle between the wave produced by oscillator 28 and generator 11 whereas balanced modulator 33 is controlled by a direct current voltage proportional to the cosine of the same phase angle. Thus it is seen that as the phase angle alternates, the amplitude of the voltage obtained from balanced modulator 32 rises and falls harmonically in phase quadrature with the amplitude of the voltage issuing from modulator 33 so that the vectorial sum of these voltages, as may be monitored by vector summation circuit 34 and indicator 35, remains constant.

These sinusoidal and cosinusoidal relationships between the amplitudes of the balanced modulator control voltages and the relative phase angle between oscillator 28 and generator 11 are produced by phase detectors 36 and 37 respectively, to whose two inputs the voltages from oscillator 28 and phase splitting circuit 29 are supplied.

Specifically, the voltage having the phase of the X coordinate is supplied by phase detector 36 whose output controls balanced modulator 33 by which the alternating voltage corresponding to the Y axis is modified.

In a similar way a voltage having a phase corresponding to that of Y coordinate is supplied to phase detector 37 whose output controls balanced modulator 32 through which flows the alternating voltage representative of the X coordinate.

Since the amplitudes of the waves from oscillator 28 and generator 11 are constant, the voltages produced by phase detectors 36 and 37 are solely functions of the phase relationship between these waves. The outputs of balanced modulators 32 and 33 are routed to controller amplifiers 38, 39 whose function is to modify the amplitudes of the alternating components supplied thereto in like proportion.

This proportion is determined by the amplified error signal derived from scalar summation network 21. An integrating circuit 40 is interposed in conductor 41 connected to scalar summation network 21 in order to make the rate change of this amplitude of R proportional to the error at network 21.

It is to be observed that the variation in the quadrature voltages issuing from controller amplifiers 38 and 39 are altered in similar proportion in order not to introduce any phase shift in the vector resultant of these voltages. For, the entire phase rotation of the vector resultant is introduced only by the action of oscillator 28 and its associated phase detectors 36, 37 and balanced modulators 32, 33.

The outputs from amplifiers 38 and 39 are applied to constant gain power amplifiers 42 and 43. The outputs of power amplifiers 42 and 43 are combined in vector summation circuit 44 to deliver an alternating signal corresponding to the assumed synthesized R vector and the action now proceeds as described in Fig. 2.

As has been stated, if the synthesized voltage R appearing at the output of summation circuit 44 does not solve the physical problem set into the computer, error signals $E_a$ and $E_b$ will issue from summation networks 20 and 21 tending to so modify the X and Y voltages, that their vectorial sum approaches the true solution to any desired degree.

After the positional problem is set into the computer, a solution is derived substantially instantaneously since there are no electromechanical components anywhere in the apparatus to offer any appreciable time delay.

The actual position of the craft in rectangular coordinate terms may be determinable by employing phase detectors 45 and 46 in association with the outputs of power amplifiers 42 and 43, respectively. Phase detectors 45, 46 are further supplied a reference phase voltage from the polar axis generator 11 so that zero centered meters 47 and 48 energized by phase detectors 45 and 46, respectively, indicate not only the rectangular coordinate distance of the craft from the transmitter O in terms of convenient linear measurement but also the sense of the direction from the transmitter so that the quadrant wherein the said receiver is located is determined.

Moreover, if the solution of the problem is desired in terms of rectangular coordinates, these coordinates may be taken as outputs from leads 49 and 50 coming from phase detectors 45, 46.

The required phase quadrature, or 90° phase relationship between coordinates X and Y may be maintained substantially constant by means of the novel arrangement as shown in Fig. 4. The necessary precision for maintaining a 90° phase shift with any desired accuracy is obtained substantially free of frequency shift effects otherwise tending to alter the phase relationship.

Graphically, the operation of this circuit is explained by Fig. 6, whereby the principle, exemplified by equation, (6)     $/X+jY/-/X-jY/=$ error signal that irrespective of the amplitudes of X and Y the scalar sum of the vectors is equal to their difference only if their phase angle equals 90°, is illustrated.

In Fig. 4, the phase converters 51, 52 may include any variable resistance device such as an electron discharge tube whose internal resistance may be varied by direct current control means or voltages so as to vary their phasal outputs. The outputs from phase converters 51, 52 are directed to summation networks 53, 54 which function to alegbraically add the input voltages directed thereto. Networks 53, 54 may comprise similar type electronic amplifiers. However, the output from phase converter 51 is directed to an inverter tube 55 so as to shift the phase of the signal by 180° prior to affecting network 54.

To obtain the absolute magnitude from either of the outputs of networks 53 and 54, rectifiers 56 and 57 are connected thereto so as to deliver direct voltages to comparator circuit 58.

This comparator circuit 58 determines the absolute difference between the magnitudes of the voltages introduced to it. If a positive difference results therefrom, then one of the phase converter tubes receives a positive voltage at the grid thereof while the other receives a negative voltage on its grid so as to vary the bias in opposite directions. In this way, the error signal is kept substantially zero and the phase between coordinate X and Y is maintained at substantially 90°.

In Fig. 5 there is shown a modification of the invention described in Fig. 3 whereby vector $R_b$, or similarly vector $R_a$, may be obtained directly through the use of the X and Y coordinates obviating the necessity for phase shifters 13, 14 and conductors 59, 60 as shown in Fig. 3.

To obtain vector $R_b$, electrical voltages representing vectors $X_b$ and $Y_b$ are taken directly as output voltages from phase splitting network 29 at terminals 61, 62 and routed by means of conductors 63, 64 to vector summation network 16 after having been suitably attenuated by means of attenuators 65, 66 so as to electrically correspond to base line OB as hereinbefore described in Figs. 2 and 3.

As has been seen, it is the function of the balanced modulators 32, 33 operating under the control of the phase detectors 36 and 37 as energized from oscillator 28 to control the amplitudes of the coordinate voltages representative of vectors X and Y provided initially by polar axis generator 11, in accordance with the sine and cosine of the angle of the unknown position of the receiver P from point O.

It is to be understood that this modification of the coordinate voltages X and Y may be accomplished by employing component resolvers such as rotary or selsyn transformers or sinusoidal potentiometers fixed to a common shaft and adapted to alter the coordinate voltages, above mentioned, as actuated by a servo motor amplifier in response to the same error signal which controls the oscillator 28.

In analogous fashion, attenuators may also be mounted on a common shaft and actuated by a servo amplifier to serve the same function as the controller amplifiers 38 and 39 shown in Fig. 3 and as such may be substituted therefor.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a navigation system based on a system of geographic coordinates utilizing a plurality of radio transmitters and a radio receiver located at a craft, a computer comprising means for converting said received radio signals into unidirectional voltages according to the position of said craft at the interception of a pair of said geographic coordinates, alternating current means generating an electrical voltage corresponding to the absolute magnitude of an assumed electrical vector, means generating a plurality of electrical voltages corresponding to the absolute magnitudes of known positional data and means for algebraically adding said voltages to obtain a signal used in developing an electrical vector corresponding to the position of said craft from one of said stations.

2. In a hyperbolic navigation system of the type having master and slave transmitters and craft receiver means adapted to supply data determining craft position in hyperbolic coordinates; a computer, comprising a reference alternating current generator providing a reference voltage vector, a second alternating current generator providing an assumed voltage vector representing the receiver position from the master transmitter, a pair of phase shifters having variably attenuated outputs connected in parallel to said reference generator to provide constant vector voltages representing the locations of the slave transmitters to the master transmitters, transformers means to add said assumed vector voltage and said constant vectors to provide a pair of third vectors representing the distance and direction of said receiver from said slave stations, detector means connected to said assumed vector generator to provide a D. C. voltage therefrom, second detector means connected to said transformer means to provide a D. C. output therefrom, and a pair of summation network means to algebracially add said two detector outputs and the D. C. output from said receiver thereby providing error outputs when said assmued vector is not correct and servo motor means responsive to said error outputs to drive said assumed vector generator, to correct said assumed vector.

3. In a hyperbolic navigation system of the type having master and slave transmitters and craft receiver means adapted to supply data determining craft position in hyperbolic coordinates; a computer, comprising a reference alternating current generator providing a reference voltage vector, a second alternating current generator providing an assumed voltage vector representing the receiver position from the master transmitter, a pair of phase shifters having variably attenuated outputs connected to said reference generator to provide constant vector voltages representing the locations of the slave transmitters to the master transmitters, transformer means to add said assumed vector voltage and said constant vectors to provide a pair of third vectors representing the distance and direction of said receiver from said slave stations, means to compare said vector voltages and said hyperbolic data according to a predetermined relationship to derive an error signal and means responsive to said error signal to correct said assumed vector.

4. In a hyperbolic navigation system of the type having master and slave transmitters and craft receiver means adapted to supply data determining craft position in hyperbolic coordinates; a computer to derive the distance from said craft receiver to a reference point, comprising means to generate an assumed alternating voltage vector to represent said distance and direction, means to generate other voltage vectors representing the known distances and directions of said slave stations from said master station, means for comparing said vector voltages and said hyperbolic data according to a known relationship to thereby provide an error signal and means responsive to said error signal for correcting said assumed vector.

5. In a radio navigation system of the type having a plurality of transmitters and a craft receiver responsive to said transmitters to receive voltages determining craft position; means for generating an assumed alternating vector voltage having amplitude and phase approximating the position of said craft with reference to a first of said transmitters, means for generating an alternating vector voltage approximating the known position of a second transmitting station relative to said first station, vector summation means connected to said two generating means and adapted to obtain the difference vector between said assumed and known vectors, scalar summation means connected to said vector summation means said assumed vector generating means and said receiver means and adapted to compare the amplitude difference between said assumed vector and said difference vector with the voltage received from said receiver, servo means connected to said scalar summation means and adapted to correct said assumed vector voltage, and utilization means connected to said servo means.

6. In a radio navigation system of the type having a plurality of transmitters and a craft receiver responsive to said transmitters to receive voltages determining craft position; means for generating an assumed alternating vector voltage having amplitude and phase approximately the position of said craft with reference to a first of said transmitters, means for generating an alternating vector voltage approximating the known position of a second transmitting station relative to said first station, vector summation means connected to said two generating means and adapted to obtain the difference vector between said assumed and known vectors, scalar summation means connected to said vector summation means, said assumed vector generating means and said receiver means adapted to compare the amplitude difference between said assumed vector and said difference vector with the voltage received from said receiver, servo means connected to said scalar summation means and adapted to correct said assumed vector voltage, and craft automatic pilot means connected to said servo means.

7. In a radio navigation system of the type having a plurality of transmitters and a craft receiver responsive to said transmitters to receive voltages determining craft position; means for generating an assumed alternating vector voltage having amplitude and phase approximating the position of said craft with reference to a first of said transmitters, means for generating an alternating vector voltage approximating the known position of a second transmitting station relative to said first station, vector summation means connected to said two generating means and adapted to obtain the difference vector between said assumed and known vectors, scalar summation means connected to said vector summation means, said assumed generating means and said receiver means adapted to compare the amplitude difference between said assumed vector and said difference vector with the voltage received from said receiver, and servo means connected to said scalar summation means and adapted to separately control the amplitude and phase of said assumed vector voltage.

WINSLOW PALMER.

REFERENCES CITED

The following references are of record in the file of this patent:

UNITED STATES PATENTS

| Number | Name | Date |
|---|---|---|
| 2,137,847 | Libman | Nov. 22, 1938 |
| 2,139,057 | Brockstedt | Dec. 6, 1938 |
| 2,204,438 | Neufeld | June 11, 1940 |
| 2,382,994 | Holden | Aug. 21, 1945 |
| 2,385,334 | Davey | Sept. 25, 1945 |
| 2,401,779 | Swartzel, Jr. | June 11, 1946 |
| 2,402,359 | Bedford | June 18, 1946 |
| 2,403,429 | Anderson | July 9, 1946 |
| 2,403,600 | Holmes | July 9, 1946 |
| 2,404,387 | Lovell | July 23, 1946 |
| 2,405,238 | Seeley | Aug. 6, 1946 |
| 2,423,337 | Moseley | July 1, 1947 |
| 2,437,251 | Frische et al. | Mar. 9, 1948 |
| 2,472,129 | Streeter | June 7, 1949 |